United States Patent
Yang et al.

(10) Patent No.: US 8,982,936 B2
(45) Date of Patent: Mar. 17, 2015

(54) METHOD AND APPARATUS FOR SIMULTANEOUS RF TESTING OF MULTIPLE DEVICES IN SPECIFIC FREQUENCY BANDS

(75) Inventors: Michael Shih Chiang Yang, Saratoga, CA (US); Lin Guo, Los Altos, CA (US)

(73) Assignee: Insight Scientific International (Shanghai) Ltd. (CN)

( * ) Notice: Subject to any disclaimer, the term of this patent is extended or adjusted under 35 U.S.C. 154(b) by 100 days.

(21) Appl. No.: 13/443,254

(22) Filed: Apr. 10, 2012

(65) Prior Publication Data

US 2013/0266052 A1    Oct. 10, 2013

(51) Int. Cl.
*H04B 17/00*  (2006.01)

(52) U.S. Cl.
CPC .......... *H04B 17/008* (2013.01); *H04B 17/0085* (2013.01)
USPC ........... 375/224; 375/267; 375/299; 375/316; 375/347; 455/67.11; 455/101; 455/132; 455/500; 455/562.1; 370/235; 370/464; 714/712

(58) Field of Classification Search
CPC ............. H04B 17/004; H04B 17/0042; H04B 17/008; H04B 17/0085; H04B 3/46; H04L 1/20; H04L 1/24
USPC .......................... 375/224, 267, 299, 316, 347; 455/67.11, 101, 132, 500, 562.1; 370/235, 464; 714/712
See application file for complete search history.

(56) References Cited

U.S. PATENT DOCUMENTS

| 8,036,617 | B2 | 10/2011 | Olgaard | |
| 2010/0123471 | A1* | 5/2010 | Olgaard et al. | 324/754 |
| 2010/0148827 | A1 | 6/2010 | Olgaard | |
| 2012/0264377 | A1* | 10/2012 | Seelenfreund et al. | 455/67.11 |
| 2012/0269288 | A1* | 10/2012 | Olgaard et al. | 375/296 |

* cited by examiner

*Primary Examiner* — Leon Flores
(74) *Attorney, Agent, or Firm* — Innovation Counsel LLP (57) ABSTRACT

A system employing vector signal generator (VSG) and vector signal analyzer (VSA) modules or cards that are configured to test multiple devices under test simultaneously. Each VSG is configured to generate multiple RF test signals and send them to multiple devices under test simultaneously. Similarly, each VSA is configured with multiple signal receiving modules connected to a single controller or memory. Each signal receiving module receives an RF signal from a device under test, converts it to a baseband digital signal, and transmits this digital signal to the VSA's memory. A single RF testing system can employ multiple such VSGs and VSAs, each capable of evaluating multiple devices under test. Each VSG/VSA can further be tuned for operation in discrete or defined frequency bands, which are narrower than those for conventional RF testers, and which can correspond to various wireless standards.

10 Claims, 12 Drawing Sheets

METHOD AND APPARATUS FOR SIMULTANEOUS RF TESTING OF MULTIPLE DEVICES IN SPECIFIC FREQUENCY BANDS

BRIEF DESCRIPTION

Embodiments of the invention relate generally to radio frequency (RF) testing. More specifically, embodiments of the invention relate to methods and apparatuses for simultaneous RF testing of multiple devices in specific frequency bands.

BACKGROUND

The recent proliferation of wireless devices and other systems with RF transmission/reception capability, such as cellular phones and RF modules, as well as other RF-capable devices like ICs, base stations, RF transmitters, other wireless systems, has led to an increase in demand for RF test equipment. This test equipment, usually used to test the RF functionality of wireless devices, typically operates by transmitting RF test signals, including data or commands, to a target wireless device, or device under test. The device under test is programmed to generate specific RF signals in response, and transmits these responsive signals back to the test equipment, where the signals are analyzed to determine the working condition of the device under test.

However, current modular RF test equipment suffers from a number of drawbacks. For example, most single modules or RF test cards are often limited in their ability to scan multiple devices under test simultaneously. Also, given that current modular RF test equipment is designed to cover a wide range of frequencies, they suffer from complex, high-cost designs. The RF test process thus often suffers from both low throughput, slowing the manufacturing and verification process, as well as high cost. Accordingly, ongoing efforts exist to improve the speed and quality of both RF test equipment and the RF testing process, and to reduce equipment costs.

SUMMARY

The invention can be implemented in many ways, for example as a system and as a method.

In one embodiment, a system for radio frequency (RF) testing comprises a vector signal generator having a first module configured to store a digital representation of a test signal, and a plurality of second modules each in electronic communication with the first module so as to receive the digital representation of a test signal from the first module. Each second module is also configured to generate an RF test signal from the received digital representation of a test signal, and each is further configured to transmit its generated RF test signal to a device under test.

In another embodiment, a system for RF testing comprises a vector signal analyzer having a first module configured to store result signals resulting from RF testing of a plurality of devices under test, and a plurality of second modules each in electronic communication with the first module. Each second module is also configured to receive an RF test result signal from a corresponding one of the devices under test, to generate ones of the result signals from the received RF test result signal, and to transmit the result signals to the first module.

In a further embodiment, a method of conducting parallel RF testing of multiple devices under test comprises retrieving a digital representation of a test signal, and transmitting a copy of the digital representation of a test signal to each of a plurality of signal generation modules. This transmission is performed so as to generate, from the signal generation modules, a plurality of RF test signals from the digital representation of a test signal. The method also includes transmitting the plurality of RF test signals to a plurality of devices under test.

In a still further embodiment, a system for RF testing comprises a vector signal generator having a first module, a digital to analog converter, an RF upconverter, and a plurality of second modules. The first module is configured to store a digital representation of a test signal. The digital to analog converter is in electronic communication with the first module, and is configured to receive the digital representation of a test signal from the first module and to convert the digital representation of a test signal to an analog signal. The RF upconverter is in electronic communication with the digital to analog converter so as to receive the analog signal from the digital to analog converter, and the RF upconverter is also configured to upconvert the analog signal to a generated RF test signal. The second modules are each in electronic communication with the RF upconverter so as to receive the generated RF test signal from the RF upconverter, and are each configured to transmit their generated RF test signals to a device under test.

In embodiments of the invention, RF test modules are designed to cover only those frequencies used for predetermined wireless standards. This is in contrast to those RF test modules on the market today, which are designed to cover a wide range of frequencies, many of which are not used by any commercial wireless standards. Test equipment for manufacturing of commercial wireless devices need only focus on selected frequency bands for commercial wireless standards. As a result, test equipment of embodiments of the invention is both cheaper and of higher measurement quality.

Like reference numerals refer to corresponding parts throughout the drawings.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION

In one embodiment, the invention is a system employing vector signal generator (VSG) and vector signal analyzer (VSA) modules or cards that are configured to test multiple devices under test simultaneously. Each VSG is configured with a single controller or memory and multiple signal generation modules. The controller transmits a digital test signal to each signal generation module simultaneously, and each module converts this digital signal to an analog RF signal. In this manner, multiple RF test signals are generated and sent to multiple devices under test simultaneously. Similarly, each VSA is configured with multiple signal receiving modules connected to a single controller or memory. Each signal receiving module receives an RF signal from a device under test, converts it to a baseband digital signal, and transmits this digital signal to the VSA's memory. A single RF testing system can employ multiple such VSGs and VSAs, each capable of evaluating multiple devices under test. In this manner, one testing system can test multiple devices simultaneously or substantially simultaneously, improving the throughput, increasing the efficiency, and reducing the cost of RF device testing.

Figure 1:
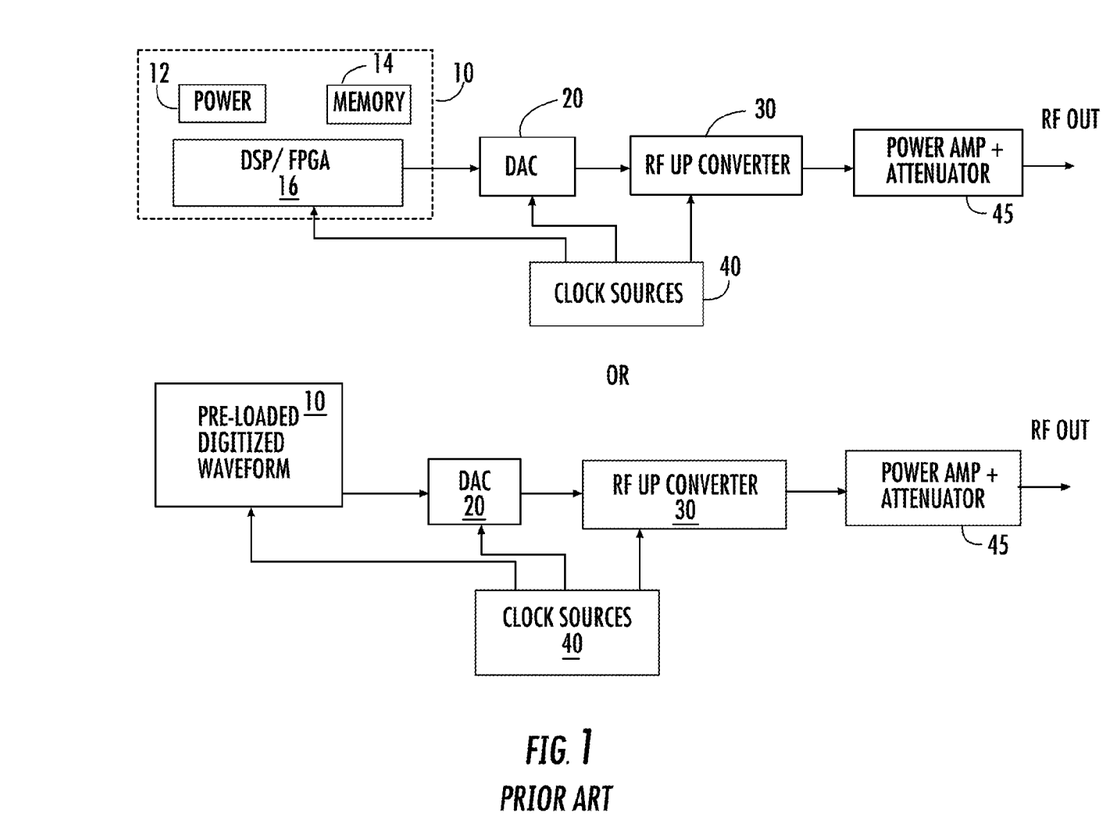
FIG. 1 is a block diagram illustration of conventional vector signal generators.

To illustrate certain aspects of the invention by way of contrast, FIG. 1 is a block diagram representation of a conventional VSG. Typical conventional VSGs are configured in one of two ways. The first configuration, shown as the upper block diagram of FIG. 1, has a controller 10, digital to analog converter (DAC) 20, RF upconverter 30, one or more clocks 40, and a power amplifier and attenuator 45. The controller 10 in turn has a power module 12, memory 14, and processor 16, which in this case is a digital signal processor (DSP) or a field programmable gate array (FPGA). The processor 16 retrieves digitized representations of test signals from the memory 10 and sends them to the DAC 20 for conversion to an analog signal, which is in turn sent to the RF upconverter 30 to be upconverted to an RF-spectrum signal. This RF signal is then amplified by the power amplifier 45, and transmitted to a device under test. The operation of this VSG is governed by timing, or clock, signals sent to the various blocks from the clock sources 40.

Alternatively, as shown in the lower block diagram of FIG. 1, the controller 10 can contain only a memory and memory controller, rather than a separate processor 16. This configuration functions similar to that of the previous configuration, retrieving digital representations of test signals from memory 10, converting them to analog signals, upconverting these analog signals, and transmitting the upconverted RF signals to a device under test.

Figure 2:
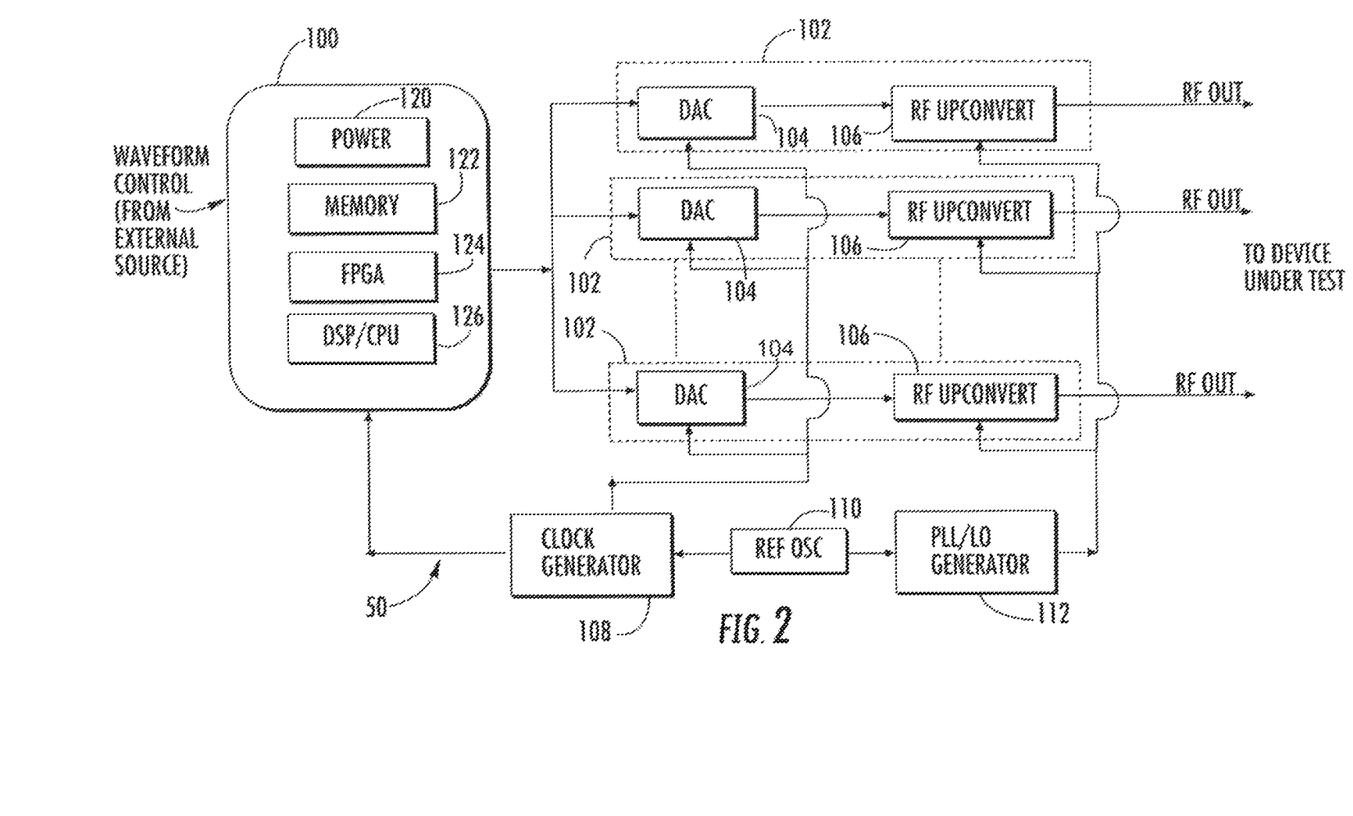
FIG. 2 is a block diagram illustration of a vector signal generator configured in accordance with an embodiment of the present invention.

Notably, both configurations of FIG. 1 can generate and transmit only a single RF signal at a time, and thus can only test one device under test at a time, limiting the throughput of the overall test process. Embodiments of the invention provide a solution to this problem. As one example, FIG. 2 is a block diagram illustration of an exemplary VSG capable of use in concurrent RF testing of multiple devices under test. Here, each VSG 50 contains a controller block 100, a number of signal generator blocks 102, a clock generator 108, reference oscillator 110, and PLL/LO generator 112.

Each signal generator block 102 has a DAC 104, an RF upconverter 106, and an RF transmitter (not shown). The controller block 100 is connected to the DAC 104 of each signal generator block 102. Also, the clock generator 108 is connected to the DAC 104 of each signal generator block 102, and the PLL/LO generator 112 is connected to the RF upconverter 106 of each signal generator block 102.

The controller block 100 includes a power block 120, memory 122, controller 124 which can be an FPGA, and a processor 126 which can be a DSP, central processing unit (CPU), or the like. The processor 126 generates the modulated digital waveform from the data stored in memory 122. Certain configurations may not employ an FPGA 124 if the processor 126 is sufficient to generate digital waveforms. The controller block 100 and the various DACs 104 are typically connected by a high speed serial link.

In operation, waveforms are received from an external source such as a host computer, and placed in the memory 122, where they are transmitted to the DACs 104. The DACs 104 convert each digital waveform to an analog signal which is then sent to its RF upconverter 106. The RF upconverters 106 upconvert these analog signals to RF signals in known manner, and send the RF signals to a power amplifier (not shown) for boosting to the proper signal power levels expected by the device under test. The boosted signals are then sent to the RF transmitter for transmission to a corresponding device under test. In this manner, the various signal generator blocks 102 transmit the same RF test signals to their devices under test substantially simultaneously, so that a number of devices are tested in parallel.

The clock generator 108 sends clock signals to the controller and buffer block 100 and DACs 104 to control the timing of each (i.e. when, and at what rate, information is transferred into and out of each of these blocks), and the PLL/LO generator 112 generates the local oscillator (LO) signal used by the RF upconverters 106 in upconversion. The clock generator 108 and PLL/LO generator 112 each operate in known fashion, generating their respective signals according to timing signals from reference oscillator 110.

One of ordinary skill in the art will observe that the components of each VSG 50 can be implemented on a single card, printed circuit board (PCB), or any other substrate capable of supporting electronic equipment, and such a configuration is preferable for many applications. However, one of ordinary skill in the art will observe that the VSG 50 can also be implemented as any number of separate cards, boards, or substrates. Furthermore, each VSG 50 can include any number of signal generator blocks 102. In particular, each signal generator block 102 can test one device under test at a time, so the addition of multiple signal generator blocks 102 allows each VSG 50 to test multiple devices simultaneously. Any number of signal generator blocks 102 is contemplated, and the number of such blocks 102 is only limited by constraints such as space on the VSG 50 card(s), data throughput, the number of devices to be tested, or the like.

Figure 3:
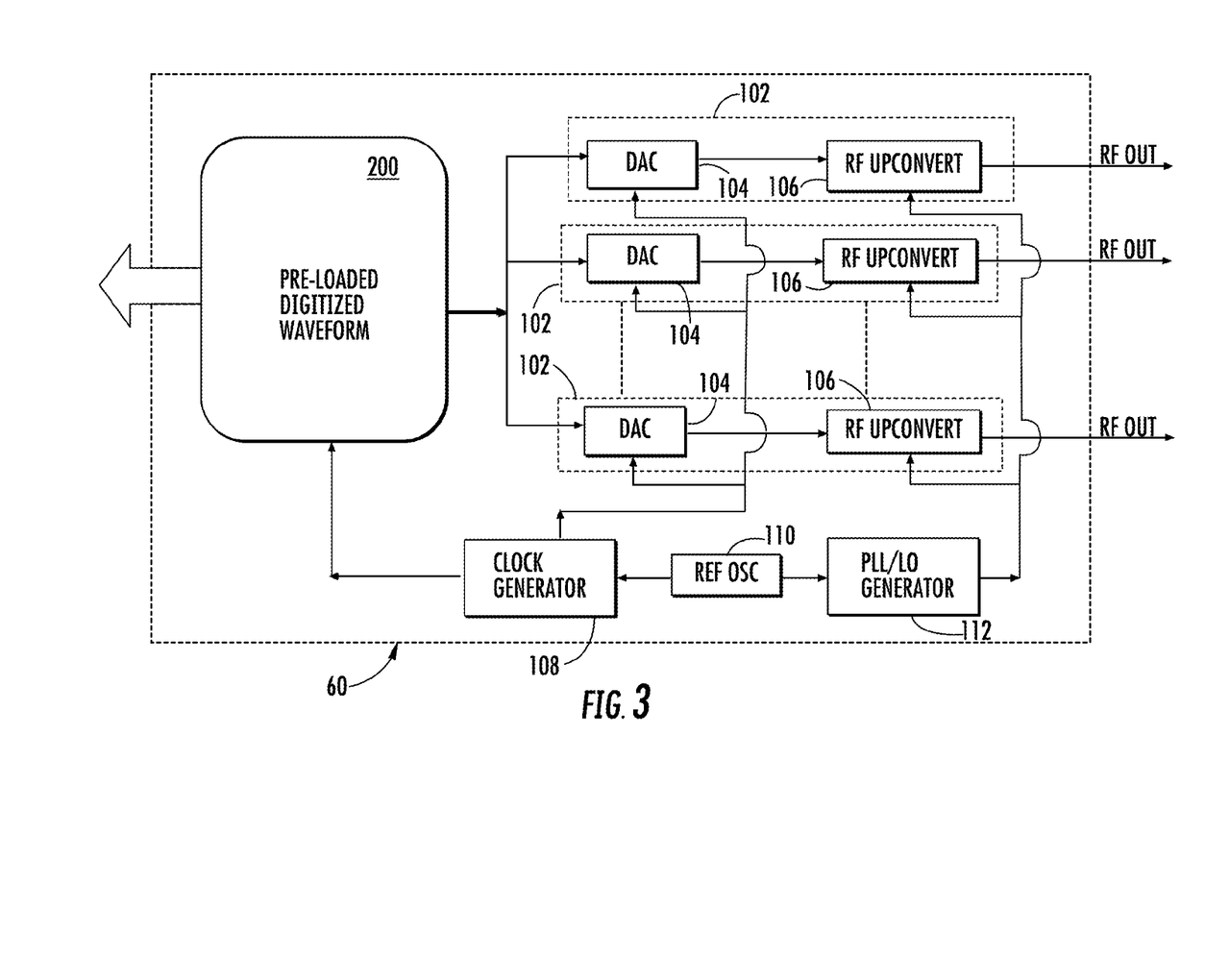
FIG. 3 is a block diagram illustration of a vector signal generator constructed in accordance with another embodiment of the present invention.

FIG. 3 illustrates another configuration of VSG contemplated by the invention. The VSG 60 of FIG. 3 is similar to the VSG 50 of FIG. 2, except that the controller 100 is replaced with a memory block 200. The memory block 200 does not have the FPGA 124 and DSP/CPU 126 blocks of controller 100, but is instead programmed only to store waveforms it receives from an external source, and upon prompting, to distribute them simultaneously to the DAC 104 of each signal generator block 102. Each signal generator block 102 then functions similarly to the above, converting its received digital waveform to an analog signal, upconverting it to an RF test signal, and broadcasting this test signal to a device under test. In this manner, the VSG 60 of FIG. 3 can be viewed as a more simplified version of the VSG 50, with a simplified memory block 200 rather than a more fully functional controller 100. This simplified memory contains fewer components than the controller 100, making for a simpler and cheaper VSG. Additionally, this simplified memory 200 may be smaller than controller 100, allowing VSG 60 to be made smaller and more compact.

The VSG configurations of FIGS. 2 and 3 confer significant advantages. In particular, the VSGs 50, 60 confer the ability to RF test multiple devices under test simultaneously or substantially simultaneously, thus increasing throughput and efficiency of the RF testing process, and decreasing overall cost. These VSG configurations also provide more consistent RF testing performance. More specifically, because conventional VSGs each can test only a single device at a time, multiple such VSGs are often employed to increase RF test throughput. However, each different VSG has different hardware, creating variation in the RF test signals generated. In particular, each conventional VSG has its own digital portion (controller and DAC), with its own separate clock, power circuitry, etc., and thus its own signal generation conditions, such as noise floor. Thus, variations in hardware between each conventional VSG result in the generation of slightly different RF test signals from VSG to VSG, even when the same digital waveform is provided as input. The above described VSGs 50, 60 avoid this problem by using the same digital portion for each signal generator block 102, thus reducing or eliminating any variation in digital signals sent to each generator block 102. Accordingly, the VSG configurations of FIGS. 2 and 3 generate more uniform RF test signals than conventional VSGs. It should also be noted that each signal generator block 120 can transmit its RF test signals to any desired target. Thus, for example, each signal generator block 120 can transmit its signals to a different device under test. Alternatively, each block 120 can transmit its signals to the same device under test, or different subsets of the plurality of blocks 120 can each transmit their signals to a different device while the blocks 120 of any particular subset each transmit their signals to the same device.

Figure 4:
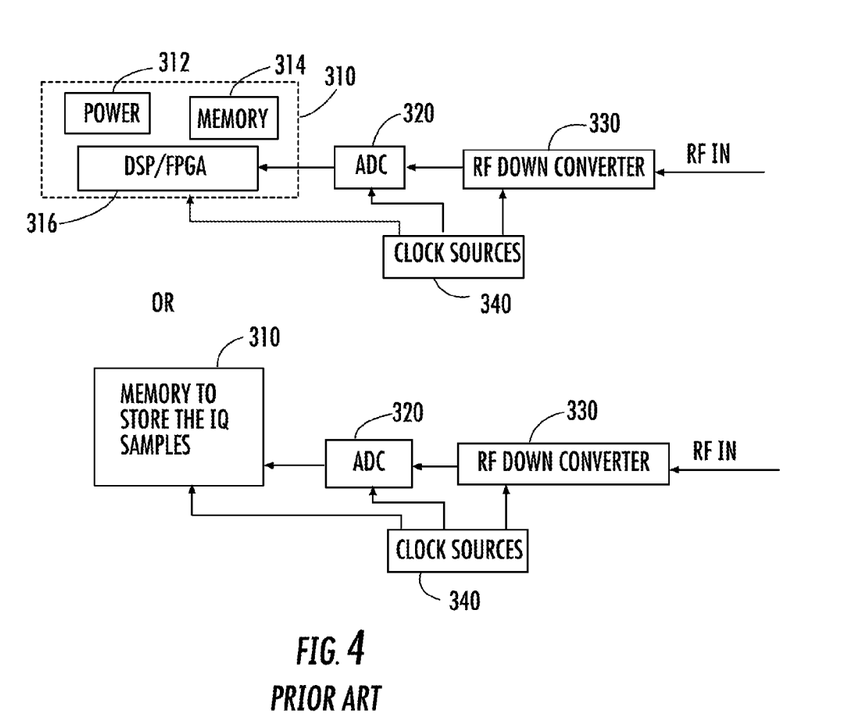
FIG. 4 is a block diagram illustration of conventional vector signal analyzers.

Embodiments of the invention also encompass VSAs, in addition to the above described VSGs. As with the VSGs, conventional VSAs are first described, and then various VSAs of embodiments of the invention are described in contrast. FIG. 4 is a block diagram representation of a conventional VSA. Typical conventional VSAs are configured in one of two ways. The first configuration, shown as the upper block diagram of FIG. 4, has a controller 310, analog to digital converter (ADC) 320, RF downconverter 330, and one or more clocks 340. The controller 310 in turn has a power module 312, memory 314, and processor 316, which can be a DSP or FPGA. RF signals transmitted by a device under test are received by the RF downconverter 330, downconverted to a baseband signal, and sent to the ADC 320. The ADC 320 converts the analog baseband signal to a digital signal and sends it to the DSP/FPGA 316 for storage in memory 314 for data processing and subsequent storage. When desired, the stored digital signal can be retrieved and sent to another processor, such as a host processor, for analysis. The operation of this VSA is governed by timing, or clock, signals sent to the various blocks from the clock sources 340.

Alternatively, as shown in the lower block diagram of FIG. 4, the controller can be only a memory and memory controller 310, rather than contain an additional processor 316. This configuration functions similar to that of the previous configuration, receiving RF test signals, downconverting them to baseband signals and converting these baseband signals to digital data for storage in memory 310.

Figure 5:
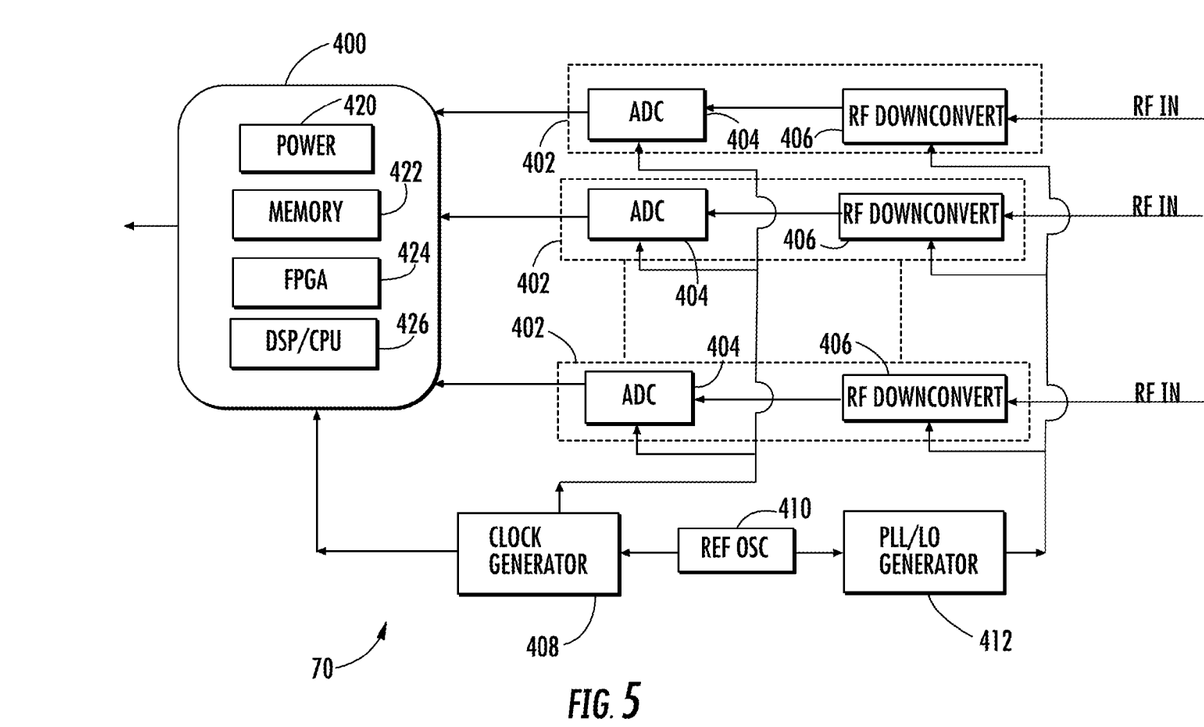
FIG. 5 is a block diagram illustration of a vector signal analyzer configured in accordance with an embodiment of the present invention.

It can be observed that the VSAs of FIG. 4 can only receive RF signals from a single device at a time, limiting RF test throughput and speed. In contrast, VSAs of embodiments of the invention allow for testing of multiple devices simultaneously. FIG. 5 is a block diagram illustration containing further details of a VSA 70 constructed in accordance with an embodiment of the present invention. The VSA 70 has a controller block 400 connected to a number of signal receiving blocks 402, as well as a clock generator 408, reference oscillator 410, and PLL/LO generator 412. Each signal receiving block 402 has an ADC 404, RF downconverter 406, and an RF antenna or receiver (not shown).

The controller block 400 has a power module 420, memory 422, FPGA or other controller 424, and DSP/CPU 426. The FPGA 424 and DSP/CPU 426 process the received data, typically including real-time demodulation of the applicable standard's physical layer. In some embodiments, the FPGA 424 is not needed, and the processing functions can be carried out by the DSP/CPU 426 itself.

In operation, each signal receiving block 402 receives an RF signal from its device under test through its RF receiver, and transmits the received RF signal to its downconverter 406. The downconverter 406 downconverts the RF signal to a baseband signal which is passed to the ADC 404 and converted to a digital signal. This digital signal is a digitized representation of the data transmitted by the device under test in response to RF test signals sent to the device by a VSG such as VSG 50, 60. The digital test data is then sent to the controller 400, which assembles the test data into a desired format, and stores the assembled data in memory 422.

The clock generator 408 sends clock signals to each ADC 404 to control its timing, while the PLL/LO generator 412 generates the LO signal used in downconversion, and sends this LO signal to each of the RF downconverters 406. The reference oscillator 410 generates a reference timing signal and sends it to both the clock generator 408 and PLL/LO generator 412, governing the timing of their respective clock and LO signals.

Figure 6:
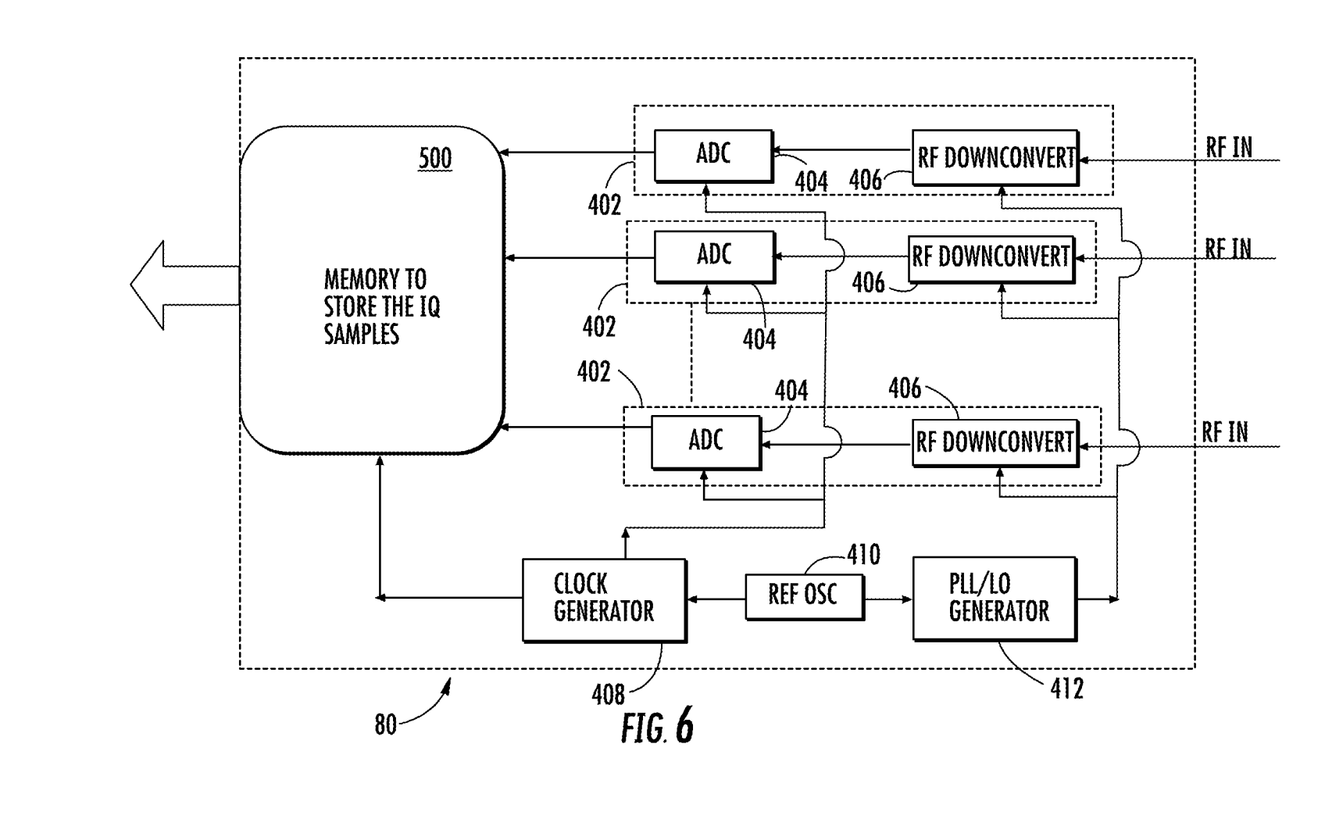
FIG. 6 is a block diagram illustration of a vector signal analyzer constructed in accordance with another embodiment of the present invention.

FIG. 6 illustrates another configuration of VSA contemplated by the invention. The VSA 80 of FIG. 6 is similar to the VSA 70 of FIG. 5, except that the controller 400 is replaced with a memory block 500. The memory block 500 does not have the FPGA 424 and DSP/CPU 426 blocks of controller 400, but is instead programmed only to store digitized test data it receives from the ADCs 404 of the signal receiving blocks 402, and upon prompting, to send the data to a host processor or other external destination. Each signal receiving block 402 functions similarly to the above, receiving RF test signals, downconverting them to baseband signals, and converting the baseband signals to digital signals for storage in memory block 500. In this manner, the VSA 80 of FIG. 6 can be viewed as a more simplified version of the VSA 70, with a simplified memory block 500 rather than a more fully functional controller 400. This simplified memory contains fewer components than the controller 400, making for a simpler and cheaper VSA. Additionally, this simplified memory 500 may be smaller than controller 400, allowing VSA 80 to be made smaller and more compact.

The above described configuration of VSAs 70, 80 are advantageous in that they allow for the simultaneous testing of more than one device under test. As above, the use of multiple parallel signal receiving blocks 402 means that each VSA 70, 80 can receive RF signals from multiple devices under test simultaneously.

One of ordinary skill in the art will observe that, like the VSGs 50, 60, the components of each VSA 70, 80 can be implemented on a single card, PCB, or any other substrate capable of supporting electronic equipment, and alternatively, each VSA 70 can also be implemented as any number of separate cards. Furthermore, each VSA 70, 80 can include any number of signal receiving blocks 402, and as each signal receiving block 402 can receive signals from one device under test at a time, the addition of multiple signal receiving blocks 402 allows each VSA 70, 80 to receive test signals from multiple devices simultaneously. Any number of signal analysis blocks 402 is contemplated, and the number of such blocks 402 is only limited by constraints such as space on the VSA 70, 80 card(s), data throughput, the number of devices to be tested, or the like. Thus, as any number of VSG cards 50, 60 and any number of VSA cards 70, 80 are contemplated, and each card 50, 60, 70, 80 can in turn contain blocks 102, 402 for testing multiple devices, RF testers incorporating these cards 50, 60, 70, 80 are able to test any number of RF devices in parallel.

Figure 10:
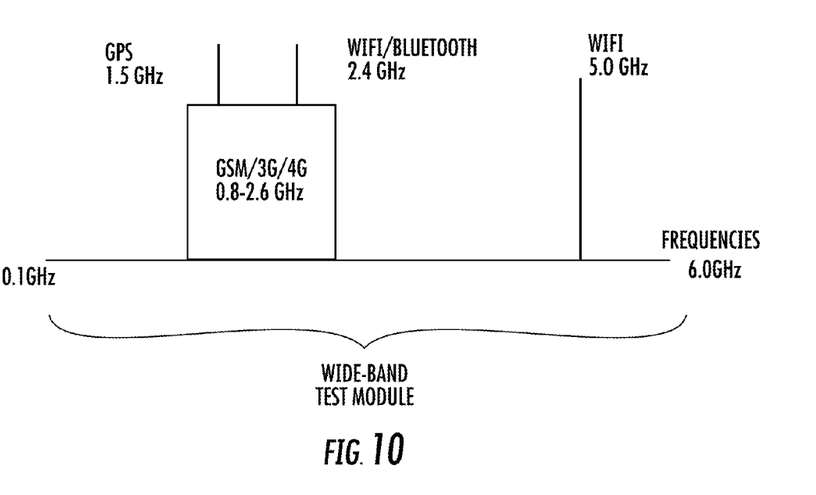
FIG. 10 illustrates frequency ranges covered by current RF test modules and frequencies used by various commercial wireless standards.

Additionally, the multiple VSGs and VSAs can each be optimized to broadcast and receive in relatively narrow frequency bands, where these frequency bands can correspond to different wireless standards, where these standards can have differing RF requirements such as bandwidth, modulation schemes, or the like. This would allow various components of the VSGs and VSAs to be designed for optimal operation only in narrower, more specific frequency bands, with specific technical specifications for particular wireless standards, which in turn further reduces their cost. In particular, VSAs designed for operation over a wide frequency range, such as that shown in FIG. 10 for conventional test modules, often require components that are expensive to produce. For example, wide-band VSAs require components such as low noise amplifiers (LNAs) that are able to cover a wide range of frequencies. Such wide-band LNAs are expensive but have conventionally been considered desirable, as the conventional wisdom has been to desire wide-band RF test equipment that has the flexibility to test devices over a wide frequency range. In contrast, embodiments of the invention employ VSAs and VSGs with components that are designed for narrower, specified frequency bands, such as those shown above the frequency axis of FIG. 10. These components are significantly cheaper (sometimes, five to ten times cheaper than corresponding wide-band components), resulting in VSAs/VSGs that are much less expensive.

Returning to the VSA example above, a conventional wideband VSA would either employ a single expensive wide-band LNA, or would string together multiple narrow-band LNAs each covering different frequency ranges, so that in the aggregate a wide range of frequencies is covered. The resulting VSA is unnecessarily expensive if testing is to be done only in specific narrow frequency bands. Thus, embodiments of the invention employ, for example, VSAs that are designed for testing only in specified narrower frequency ranges, and employing components such as narrow-band LNAs designed only for use in this narrower frequency range. Such VSAs are significantly cheaper than wide-band VSAs. Additionally, as the various components are optimized for performance within their narrow band, the resulting VSA exhibits superior performance within its frequency range, as compared to a general wide-band VSA. Accordingly, an RF testing system incorporating such wireless standards, narrow-band and wireless standard specific VSGs and VSAs can provide RF testing capability at lower cost and higher accuracy. Also, narrow-band design greatly simplifies the hardware design and the number of components, as VSGs/VSAs need only be designed for good performance in a narrow frequency range, rather than over a wide band. This reduction in components saves board space, further allowing for multiple ports on printed circuit boards of standard size modular VSA/VSG cards.

Figure 7:
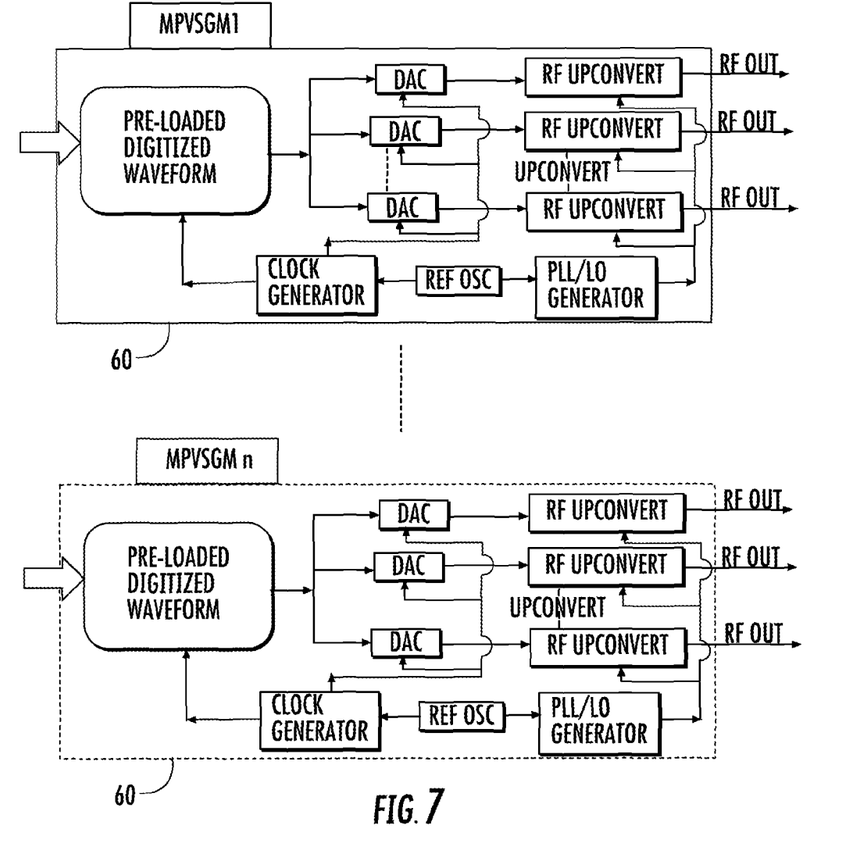
FIG. 7 illustrates an exemplary multiple vector signal generator system configured for RF testing in multiple different frequency bands.
Figure 8:
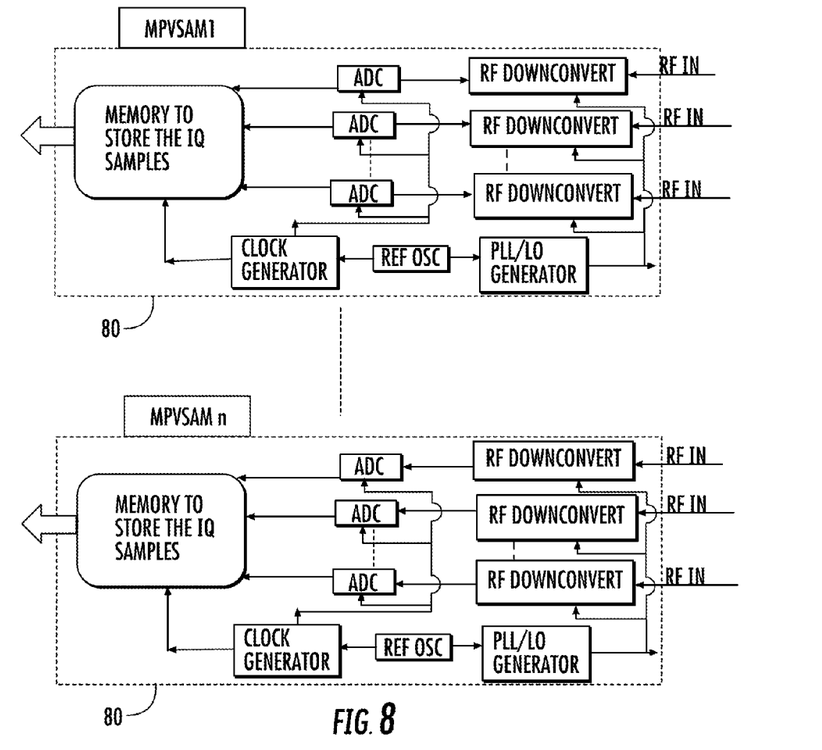
FIG. 8 illustrates an exemplary multiple vector signal analyzer system configured for RF testing in multiple different frequency bands.

FIGS. 7 and 8 respectively illustrate exemplary multiple-VSG and multiple-VSA systems configured for RF testing in multiple different frequency bands and for specific wireless standards. As shown in these figures, an RF tester can include n different VSGs 60, where each of the n VSGs 60 is designed to generate and transmit RF testing signals only in a specific narrow frequency band or group of bands, for certain wireless standards with particular technical requirements. For example, one of the n VSGs 60 can be designed so as to generate and transmit RF testing signals in the WiFi, GPS, and Bluetooth frequency bands, while another of the n VSGs 60 can be designed to generate and transmit RF testing signals in one or more other frequency bands. The various VSGs 60 can be designed for any one or more frequency bands, including the Global Positioning System (GPS), third generation mobile telecommunications (3G), Long Term Evolution (LTE), advanced LTE, and code division multiple access (CDMA) frequency bands. In similar manner, an exemplary RF tester can also include n different VSAs 80, where each of these n VSAs 80 is designed to receive and process RF signals in certain predetermined narrow frequency bands. For instance, one or more of the n VSAs 80 can be designed to receive and process (i.e., downconvert) RF testing signals in any of the above frequency bands and wireless standards. Such a configuration can thus be set up to test multiple different devices under test, in multiple different RF frequency bands and wireless standards.

One of ordinary skill in the art will recognize that, while FIGS. 7 and 8 show a multiple-VSA and multiple-VSG configuration utilizing VSGs 60 and VSAs 80, other embodiments can employ other VSAs and VSGs, such as arrays of VSGs 50 and VSAs 70. One of ordinary skill in the art will also recognize that such a system can employ any number of VSGs/VSAs, each tuned to or designed for any desired frequency bands and wireless standards, including any of the above frequency bands, or any other desired bands and/or any wireless standards.

Figure 9:
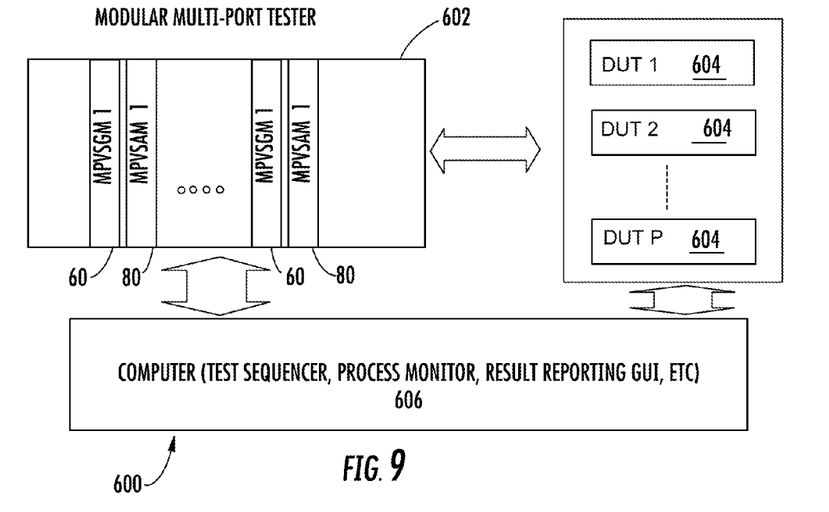
FIG. 9 illustrates a modular multi-port tester employing vector signal generators and vector signal analyzers of embodiments of the present invention.

The above described RF testing systems can be any system configured to operate multiple pairs of the VSG and VSA cards of the invention. FIG. 9 illustrates an exemplary such modular multi-port tester, employing VSGs and VSAs of embodiments of the present invention. The RF testing system 600 is configured to conduct RF testing of multiple devices under test, and includes a VSG/VSA card module 602 and a host computer 606. The module 602 can be a rack or other known computer peripheral mounting device with interface and bus circuitry to which any number of VSG 60 and VSA 80 card pairs can be connected. The host computer 606 can then direct these cards, as above, to test devices under test (DUTs) 604. In particular, the host computer 606 can transmit digital representations of the test signals to the VSGs 60 where they are stored in memory. The host computer 606 can then instruct the VSGs 60 to begin RF testing, whereupon the VSGs 60 retrieve the digitized test waveforms from their memories, convert them to analog signals, upconvert them to RF signals, and transmit the RF signals to the DUTs 604. The DUTs 604 respond by transmitting preprogrammed RF signals in response, which are received by the VSAs 80, downconverted to baseband signals, converted to digital signals, and stored in their respective memories. The stored test data are then transmitted to the host computer 606 for analysis.

Figure 11:
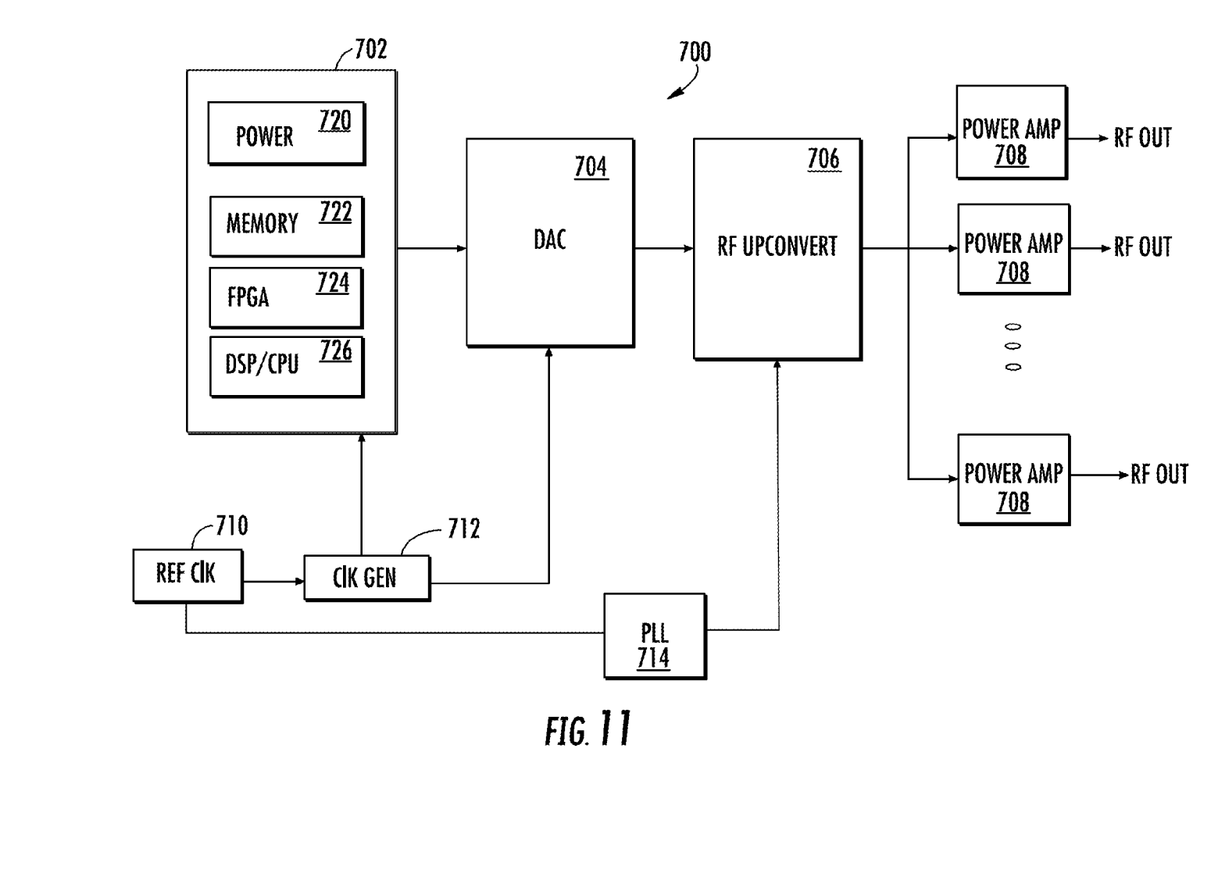
FIG. 11 is a block diagram illustration of a vector signal generator constructed in accordance with a further embodiment of the present invention.

It can be noted that each signal generator block 102 contains a DAC 104 and RF upconverter 106. Further advantages can thus be achieved by employing a common DAC and RF upconverter, rather than one for each block 102. FIG. 11 is a block diagram illustration of a vector signal generator constructed in accordance with such an embodiment. Here, a vector signal generator 700 contains a controller block 702, a DAC 704, an RF upconverter 706, and a number of power amplifiers 708, as well as a reference clock 710, clock generator 712, and PLL/LO generator 714.

The controller block 702 is connected to the DAC 704, and includes a power block 720, memory 722, controller 724 which can be an FPGA, and a processor 726 which can be a DSP, CPU, or the like. Also, the clock generator 712 is connected to the DAC 704, and the PLL/LO generator 714 is connected to the RF upconverter 706.

The power block 720, memory 722, controller 724, and DSP/CPU 726 operate in similar fashion to the corresponding components of controller block 100 of FIG. 2. Namely, the processor 726 generates a modulated digital waveform from the data stored in memory 722. As with the embodiment of FIG. 2, certain configurations may not employ an FPGA 724 if the processor 726 is sufficient to generate digital waveforms.

The operation of signal generator 700 is similar to that of VSG 50, except that a common DAC 704 and RF upconverter 706 are employed. In particular, waveforms are received from an external source such as a host computer, and stored in memory 722, where they are retrieved by DSP/CPU 726. The DSP/CPU 726 constructs a digital signal from the stored data, and transmits it to the DAC 704. The DAC 704 then converts the digital waveform to an analog signal which is then sent to RF upconverter 706. The RF upconverter 706 upconverts this analog signal to an RF signal in known manner, and sends the RF signal to a number of power amplifiers 708 which boost the RF signal to the proper signal power levels expected by the device under test. The boosted signals are then sent to RF transmitters (not shown) for transmission to a corresponding device under test. In this manner, the various amplifiers 708 transmit the same RF test signals to their devices under test substantially simultaneously, so that a number of devices are tested in parallel.

The clock generator 712 sends clock signals to the controller block 702 and DAC 704 to control the timing of each, and the PLL/LO generator 714 generates the local oscillator (LO) signal used by the RF upconverter 706 in upconversion. The clock generator 712 and PLL/LO generator 714 each operate in known fashion, generating their respective signals according to timing signals from reference clock 710.

As with the VSGs of previous embodiments, the components of each VSG 700 can be implemented on a single card, PCB, or any other substrate capable of supporting electronic equipment, or on any number of separate cards, boards, or substrates. Furthermore, each VSG 700 can include any number of power amplifiers 708, so that each VSG 700 can test multiple devices simultaneously. Any number of power amplifiers 708 is contemplated, and the number of such amplifiers 708 is only limited by constraints such as space on the VSG 700 card(s), data throughput, the number of devices to be tested, or the like.

Figure 12:
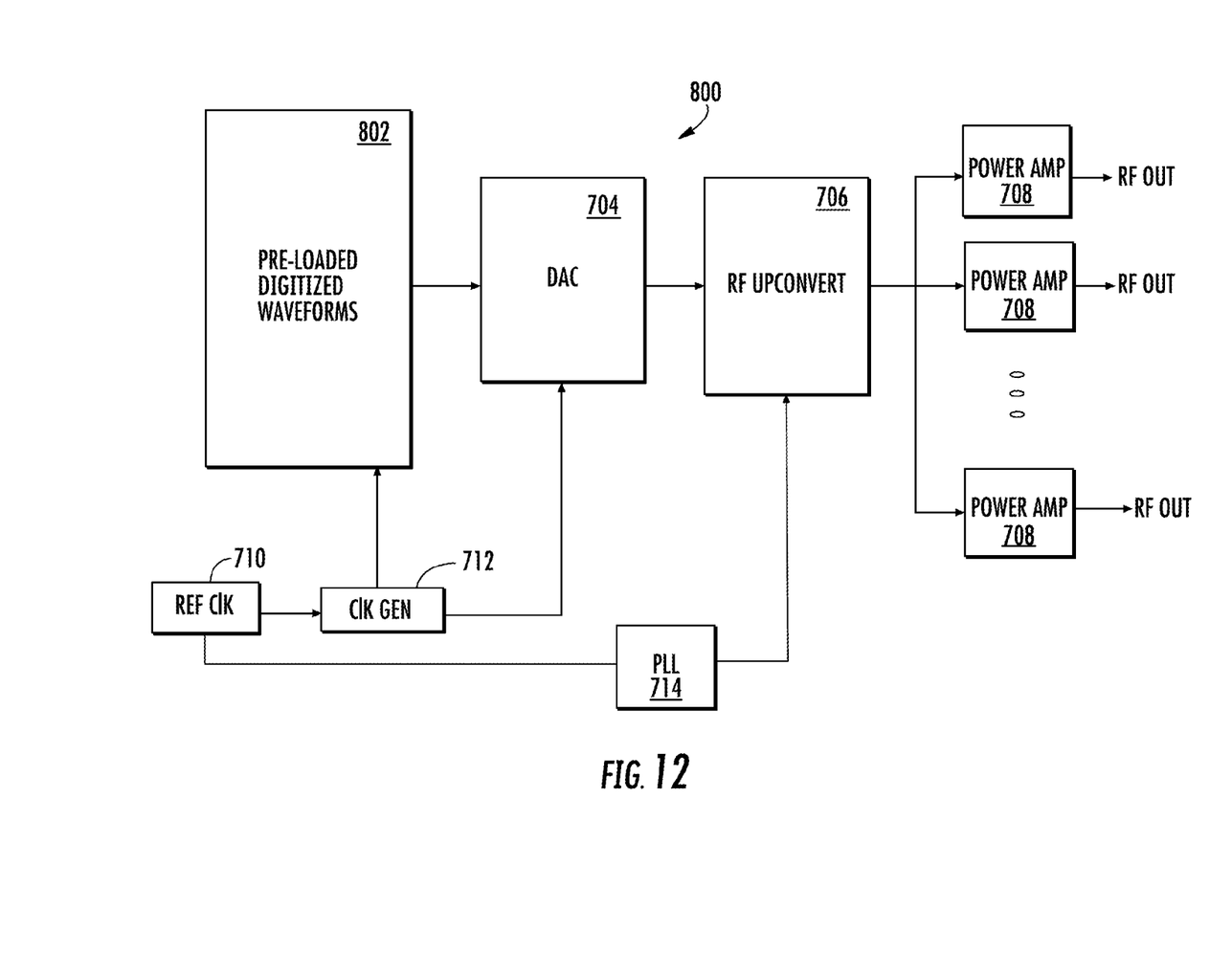
FIG. 12 is a block diagram illustration of a vector signal generator constructed in accordance with still another embodiment of the present invention.

FIG. 12 illustrates another configuration of VSG contemplated by the invention. The VSG 800 of FIG. 12 is similar to the VSG 700 of FIG. 11, except that the controller 702 is replaced with a memory block 802. The memory block 802 does not have the FPGA 724 and DSP/CPU 726 blocks of controller 702, but is instead programmed only to store waveforms it receives from an external source, and upon prompting, to transmit them to the DAC 704. The remaining components of the VSG 800 then function similarly to the above, converting its received digital waveform to an analog signal, upconverting it to an RF test signal, and broadcasting this test signal to multiple devices under test. In this manner, the VSG 800 of FIG. 12 can be viewed as a more simplified version of the VSG 700, with a simplified memory block 802 rather than a more fully functional controller 702. This simplified memory contains fewer components than the controller 702, making for a simpler and cheaper VSG. Additionally, this simplified memory 802 may be smaller than controller 702, allowing VSG 800 to be made smaller and more compact.

By employing a single DAC 704 and single RF upconverter 706 for each power amplifier 708, this embodiment ensures both that the same signal is sent to each amplifier 708, and that the same hardware platform is used to generate each signal. The embodiment of FIGS. 11-12 thus allow for even less variation between signals, as compared to previous embodiments. The embodiment of FIGS. 11-12 also allows for further cost savings, as only a single DAC 704 and RF upconverter 706 are employed, rather than one DAC 104 and RF upconverter 106 for each signal generation module 102.

Figure 13:
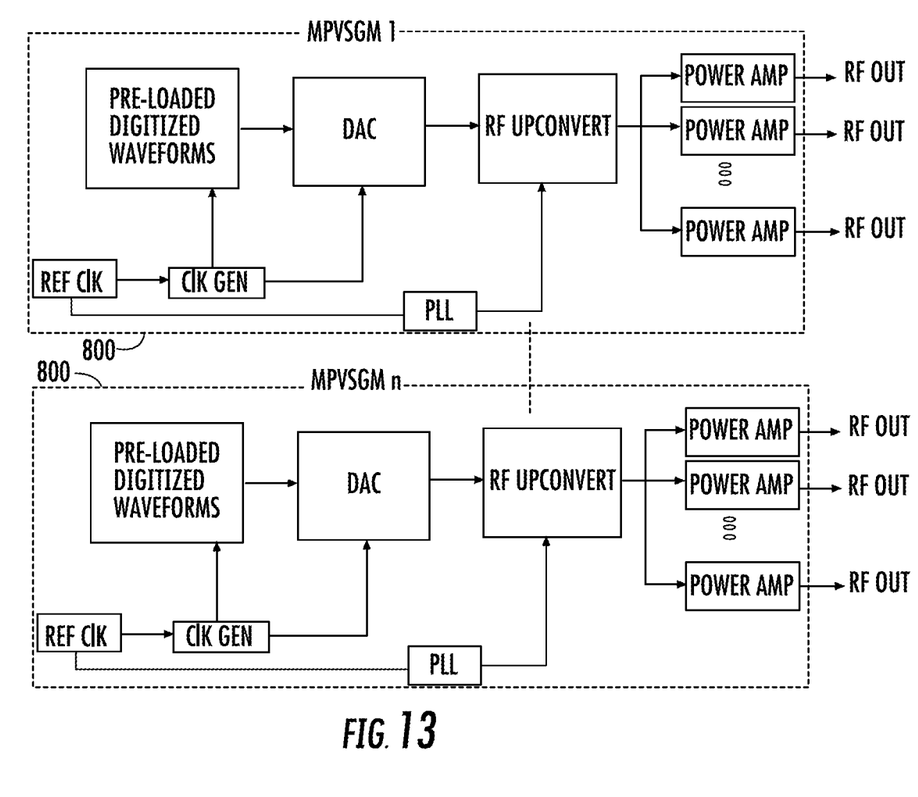
FIG. 13 illustrates another embodiment of an exemplary multiple vector signal generator system configured for RF testing in multiple different frequency bands.

Similar to FIG. 7, a test system can employ multiple VSGs 700, 800 as shown in FIG. 13. As in FIG. 7, an RF tester as shown in FIG. 13 can include n different VSGs 700 or 800. Furthermore, each of the n VSGs 700/800 can be designed to generate and transmit RF testing signals only in a specific narrow frequency band or group of bands, which may correspond to certain wireless standards with particular technical requirements. Additionally, each amplifier 708 can transmit its signals to the same device under test, or different subsets of the plurality of amplifiers 708 can each transmit their signals to a different device while the amplifiers 708 of any particular subset transmit their signals to the same device.

The above-described embodiments of the invention confer significant advantages. For example, it should be noted that the VSGs and VSAs of the invention are both significantly cheaper and produce better results than conventional devices. As the various components of the VSGs and VSAs are optimized for specific frequency ranges, the VSG/VSA itself conducts higher-quality tests (e.g., with lower noise, better accuracy, etc.). Furthermore, such VSGs/VSAs represent a significant enough cost savings that employing multiple VSGs/VSAs in a single system allows that system to effectively cover a broad range of frequencies while still costing less than a single conventional wide-band VSG/VSA. These multiple VSGs/VSAs confer the added advantage of being able to test multiple devices under test simultaneously, while a single conventional VSG/VSA can only test one device at a time. Embodiments of the invention thus allow for higher RF testing throughput at greater accuracy, all while being cheaper.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, an RF test apparatus of embodiments of the invention can contain any number of VSGs 50, 60 and any number of VSAs 70, 80. In turn, each VSG 50, 60 can contain any number of signal generator blocks 102, and each VSA 70, 80 can contain any number of signal receiving blocks 402, so that any number of devices under test can be analyzed. Additionally, the VSGs 50, 60 and VSAs 70, 80 can be designed for broadcast/reception of RF signals in any discrete or defined frequency bands for any different wireless standards, including those mentioned herein as well as any other frequency bands and wireless standards. Also, the various embodiments each have certain features that differ from those of other embodiments, and it is noted that the invention contemplates the mixing and matching of various features as desired. That is, further embodiments can be formed from the selection of various features from different embodiments. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A modular radio frequency (RF) testing system, comprising:
   a first vector signal generator configured to transmit RF test signals to one or more devices using only a first communication standard;
   a first vector signal analyzer configured to receive RF test signals from one or more devices using only the first communication standard;
   a second vector signal generator configured to transmit RF test signals to one or more devices using only a second communication standard; and
   a second vector signal analyzer configured to receive RF test signals from one or more devices using only the second communication standard,
   wherein the first communication standard and the second communication standard employ different frequency bands and different modulation schemes for communication, and
   each of the first vector signal generator and the second vector signal generator includes a plurality of generator modules, each generator module configured to:
      receive a digital representation of a test signal,
      generate the RF test signal from the digital representation of a test signal, and
      transmit its generated RF test signal to a device under test.

2. The modular RF testing system of claim 1, further comprising one or more ports configured to modularly receive a third vector signal generator, the third vector signal generator configured to transmit RF test signals to one or more devices using only a third communication standard that is different from the first and second communication standards.

3. The modular RF testing system of claim 2, wherein the one or more ports are configured to modularly receive a third vector signal analyzer, third vector signal analyzer configured to receive RF test signals from one or more devices using only the third communication standard.

4. The modular RF testing system of claim 1, wherein the first and second communication standards use frequency bands associated with two different ones of: WiFi, Bluetooth, Global Positioning System (GPS), third generation mobile telecommunications (3G), Long Term Evolution (LTE), advanced LTE, and code division multiple access (CDMA) frequency bands.

5. The modular RF testing system of claim 1, wherein each of the first vector signal analyzer and the second vector signal analyzer includes a plurality of analyzer modules, each analyzer module configured to:
   receive the RF test signal from one or more devices,
   generate a result signal from the received RF test signal, and
   transmit the result signal to a host machine in communication with the modular RF testing system.

6. A method for radio frequency (RF) testing system, comprising:
   transmitting RF test signals to one or more devices using only a first communication standard and a first vector signal generator;
   receiving RF test signals from one or more devices using only the first communication standard and a first vector signal analyzer;
   transmitting RF test signals to one or more devices using only a second communication standard and a second vector signal generator; and
   receiving RF test signals from one or more devices using only the second communication standard and a second vector signal analyzer,
   wherein the first communication standard and the second communication standard employ different frequency bands and different modulation schemes for communication, and
   each of the first vector signal generator and the second vector signal generator includes a plurality of generator modules, each generator module configured to:
      receive a digital representation of a test signal,
      generate the RF test signal from the digital representation of a test signal, and
      transmit its generated RF test signal to a device under test.

7. The method for RF testing of claim 6, further comprising transmitting RF test signals to one or more devices using only a third communication standard that is different from the first and second communication standards.

8. The method for RF testing of claim 7, further comprising receiving RF test signals from one or more devices using only the third communication standard.

9. The method for RF testing of claim 6, wherein the first and second communication standards use frequency bands associated with two different ones of: WiFi, Bluetooth, Global Positioning System (GPS), third generation mobile telecommunications (3G), Long Term Evolution (LTE), advanced LTE, and code division multiple access (CDMA) frequency bands.

10. The method for RF testing of claim 6, wherein each of the first vector signal analyzer and the second vector signal analyzer includes a plurality of analyzer modules, each analyzer module configured to:
   receive the RF test signal from one or more devices,
   generate a result signal from the received RF test signal, and
   transmit the result signal to a host machine in communication with the modular RF testing system.

* * * * *